(12) United States Patent
Valkov

(10) Patent No.: US 11,159,015 B2
(45) Date of Patent: Oct. 26, 2021

(54) METHOD AND APPARATUS FOR DELIVERING ELECTRICAL POWER TO BLOCKCHAIN PROCESSING DEVICES

(71) Applicant: Theodore Valkov Valkov, The Dalles, OR (US)

(72) Inventor: Theodore Valkov Valkov, The Dalles, OR (US)

(*) Notice: Subject to any disclaimer, the term of this patent is extended or adjusted under 35 U.S.C. 154(b) by 0 days.

(21) Appl. No.: 15/848,485

(22) Filed: Dec. 20, 2017

(65) Prior Publication Data
US 2019/0190261 A1 Jun. 20, 2019

(51) Int. Cl.
*H02J 1/04* (2006.01)
*H02J 1/08* (2006.01)
*G06F 1/26* (2006.01)
*H02M 1/10* (2006.01)

(52) U.S. Cl.
CPC ............... *H02J 1/04* (2013.01); *H02J 1/08* (2013.01); *G06F 1/26* (2013.01); *H02M 1/10* (2013.01)

(58) Field of Classification Search
CPC ..... H02J 1/04; H02J 1/08; G06F 1/26; H02M 1/10; H01B 7/00; H05K 7/203
See application file for complete search history.

(56) References Cited

U.S. PATENT DOCUMENTS

2015/0041172 A1\* 2/2015 Gareis .............. D04C 1/06
174/34

\* cited by examiner

*Primary Examiner* — Robert L Deberadinis

(57) ABSTRACT

An apparatus for delivering electrical power from the blade terminals of server power supplies to blockchain processing devices such as cryptocurrency miners, and consisting in a whip-like electrical harness composed of a pair of primary conductors, a joint, a bundle of secondary conductors, a set of connectors, and a tinned pug. A method for attaching a number of said harnesses to the output blades of server power supplies, comprising a step whereby the tinned pug is soldered to the said output blades, and a step whereby a thermoset polymer shield is molded over the junction between the said output blades and harnesses. A method for optimally sizing the said harnesses given a specific type of server power supply and cryptocurrency miner, and comprising several calculation steps. Significant advantages over current industry practices are achieved from the practice of the present invention, namely improved reliability and safety, access to broader choice of high-performance power supplies, and portability.

6 Claims, 6 Drawing Sheets

METHOD AND APPARATUS FOR DELIVERING ELECTRICAL POWER TO BLOCKCHAIN PROCESSING DEVICES

CROSS-REFERENCE TO RELATED APPLICATIONS

Not applicable.

STATEMENT RELATED TO FEDERALLY SPONSORED RESEARCH

Not applicable.

STATEMENT REGARDING PRIOR DISCLOSURES

The following prior public disclosures of subject matter related to the present invention have been made by the inventor starting in January 2017:
 a) Sale of specific physical embodiments of the invention
 b) Photographs of said embodiments as part of the sales promotional materials
 c) Text description of the advantages offered by the invention as part of the sales promotional materials In accordance with AIA 35 U.S.C. 102(b)(1)(A), said disclosures shall not be deemed prior art to the claimed invention herein. The internal or technical aspects of the invention apparatus and the details of the invention methods, described in the present specification, have not been disclosed.

FIELD OF THE INVENTION

The present invention is in the technical field of electrical engineering. More particularly, the present invention is in the technical field of electrical energy transmission. More particularly, the present invention is in the technical field of low voltage electrical power distribution. More particularly, the present invention provides novel and improved means for delivering low voltage, high-current electrical power from the regulated DC power supplies normally used in mainframe or server computers to blockchain processing devices such as cryptocurrency miners. It is suggested the present invention belongs in USPC Class 174 "Electricity: Conductors and Insulators".

BACKGROUND OF THE INVENTION, RELATED ART

The blockchain is a major innovation in computing, providing improved security, accessibility, functionality in the management of data records. It underpins cryptocurrencies such as Bitcoin or Ethereum, and their recent rise in popularity. Beyond cryptocurrencies, the blockchain is being adopted across a wide range of business processes such as smart contracts, or business record management and authentication.

Early blockchain applications could run on ordinary general-purpose computers. However, the growing usage of such applications has led to the development of specialized blockchain processing devices to execute the "proof-of-work" component of blockchain implementations. Typical examples of such devices are ASIC-based cryptocurrency miners, or large custom-configured arrays of graphic cards ("GPUs") running mining algorithms such as Scrypt or X11. Such devices have become a major component of the global computing infrastructure—for example, bitcoin mining devices alone required approximately 2 gigawatts of electrical generating capacity, and accounted for nearly 0.1% the world's electricity consumption in 2017. For brevity sake, the present specification shall use the term "miner" hereinafter to refer to the variety of blockchain processing devices which execute proof-of-work validation and other computationally intensive steps of blockchain implementations.

Miners are quite different from general purpose computers in their electrical requirements and form factor. Specifically, the typical cryptocurrency miner does not come with an integrated power supply, and requires one kilowatt or more of electrical power to be delivered at 12 Volts DC through an array of multiple PCI Express 6-pin or 8-pin power connectors ("PCI-e connectors"). As a result, each miner requires a separate regulated low-voltage DC power supply and a distribution wiring system capable of delivering electrical currents to the miner in excess of 100 Amperes at 100% duty cycle. The reliable sourcing and delivery of such large currents on a continuous basis is not a trivial task, and does not have a standardized, mass-produced solution.

Operators of miners have resorted to a number of different solutions to this challenging task. These are (a) use the 12V DC output from ordinary PC ATX power supplies which are normally pre-wired with PCI-e cables, (b) plug a small adaptor commonly referred to as "breakout board" onto the 12V output blades of server or mainframe power supplies, and install PCI-e cables from this adaptor to the miner, and (c) purchase specialized OEM mining power supplies made by the miner manufacturers, and typically featuring PCI-e cables bolted to a single 12V DC output rail. Each one of these solutions has several disadvantages.

Solution (a) has significant reliability and cost problems. PC ATX power supplies are not designed for of delivering 100 amperes or more through their 12V rails at 100% duty cycle. PC ATX power supplies cables, PCI-e connectors and output rail fittings often overheat and burn out when used in this manner. In addition, the cubic, top-vented form factor of PC ATX power supplies is not well suited for the industrial cryptocurrency mining environment, where the miners are stacked on shelves across a tight partition separating the "cold" and "hot" areas of the mine. Nevertheless, this solution remains popular with small-scale home miners and with GPU-based systems in industrial settings.

Solution (b) above is the dominant method for powering miners as of 2016-2017. The reason is the low cost, operational robustness, and outstanding performance of server or mainframe power supplies, which are easily available on the secondary IT equipment market under a wide variety of form factors and makes. The vast majority of server or mainframe power supplies are however not standalone units. They feature proprietary backplane "power blade" connectors for their low-voltage DC output, high-voltage AC input, and control signaling. The mining industry has devised a variety of custom-made breakout boards to interface miners and AC power to these power supplies. These breakout boards suffer from a number of fundamental operational and reliability problems.

Breakout boards use rows of power blade connectors matching those of the server power supply to establish an electrical connection from the power supply to the miner. The conductance of the contact area between the blades is often compromised due to poor mechanical alignment, oxidation, or wear of the gold plating. The high currents that pass through this contact area worsen these problems over time, resulting in burnout—sometimes spectacular and damaging to the miner. Burnout risks also exist at the point where the PCIe cables attach to the breakout board terminals. In addition, the end user has to provide these cables separately and perform the labor necessary to attach them. The breakout board assembly is liable to accidental disconnects, and leaves multiple points carrying live voltage exposed and liable to accidental short circuits.

Some cryptocurrency miner operators practice a low-cost variant of solution (b), whereby the PCI-e cables are attached directly to the server power supply blades using crimped "quick disconnect" spade terminals instead of breakout boards. This variant has the lowest reliability, highest resistance, highest risk of accidental short circuits, and has been implicated in a number of safety incidents.

Solution (c) above limits the choice of performance and efficiency available to the user. There is a very small number of cryptocurrency mining equipment manufacturers, and an even smaller choice of specialized miner power supplies as of 2016-2017. These specialized miner power supplies cannot equal the selection of form factors, output power, high efficiency, and low cost offered by the server or mainframe power supplies used in solution (b). Nevertheless, the convenience and safety of specialized miner power supplies has gradually earned them a significant share in the mining industry.

There is virtually no published technical literature on the subject of delivering the required low-voltage electrical power to blockchain processing devices such as cryptocurrency miners. Vendor catalogs and other technical publications from power supply manufactures focus on the power supply itself, and do not discuss the engineering aspects of delivering the output power to the machines which consume it. Cryptocurrency mine operators tend to be notoriously secretive, and generally do not publish or otherwise disclose information regarding their operations and implementation thereof.

In summary, at the time of the present invention, the field of delivering low-voltage electrical power to blockchain processing devices lacks a method permitting the use of the numerous, high-performance server or mainframe power supplies in a reliable, easy, and safe manner. For brevity sake, the term "power supply" shall be used throughout the remainder of the specification to refer to said server or mainframe power supplies (which consist in regulated DC power supply modules used by server or mainframe computers to convert high-voltage AC electrical power to low-voltage DC electrical power, and equipped with proprietary DC output connectors, such as a backplane power blade connector).

SUMMARY OF THE INVENTION

The present invention consists in an apparatus and two methods for reliably delivering large currents to blockchain processing devices such as cryptocurrency miners from the regulated DC output blades of server power supplies, and for permitting standalone operation of said power supplies in this role. The apparatus consists in a whip-like electrical harness. The first method consists in a physical procedure for attaching a number of harnesses to one such power supply. The second method consists in a design procedure to correctly size the said harnesses for given operating requirements.

Both the apparatus and the methods are novel—they were conceived, designed, and extensively tested under large scale, private use conditions by the inventor in response to the multiple problems described above. Both are non-obvious—no elements thereof have been pioneered by others despite significant advantages over existing industry practices.

BRIEF DESCRIPTION OF THE DRAWINGS AND TABLES

Table 1 lists the definition of symbols used in the specification.

DETAILED DESCRIPTION OF THE INVENTION

The present invention comprises a whip-like electrical harness apparatus ("harness"), a two-step method for attaching several of these harnesses to the output blades of a server power supply ("attachment method"), and a method for optimally sizing the harnesses for given operating requirements ("sizing method"). The harness and two methods shall be described first, followed by two specific embodiment examples.

Figure 1:
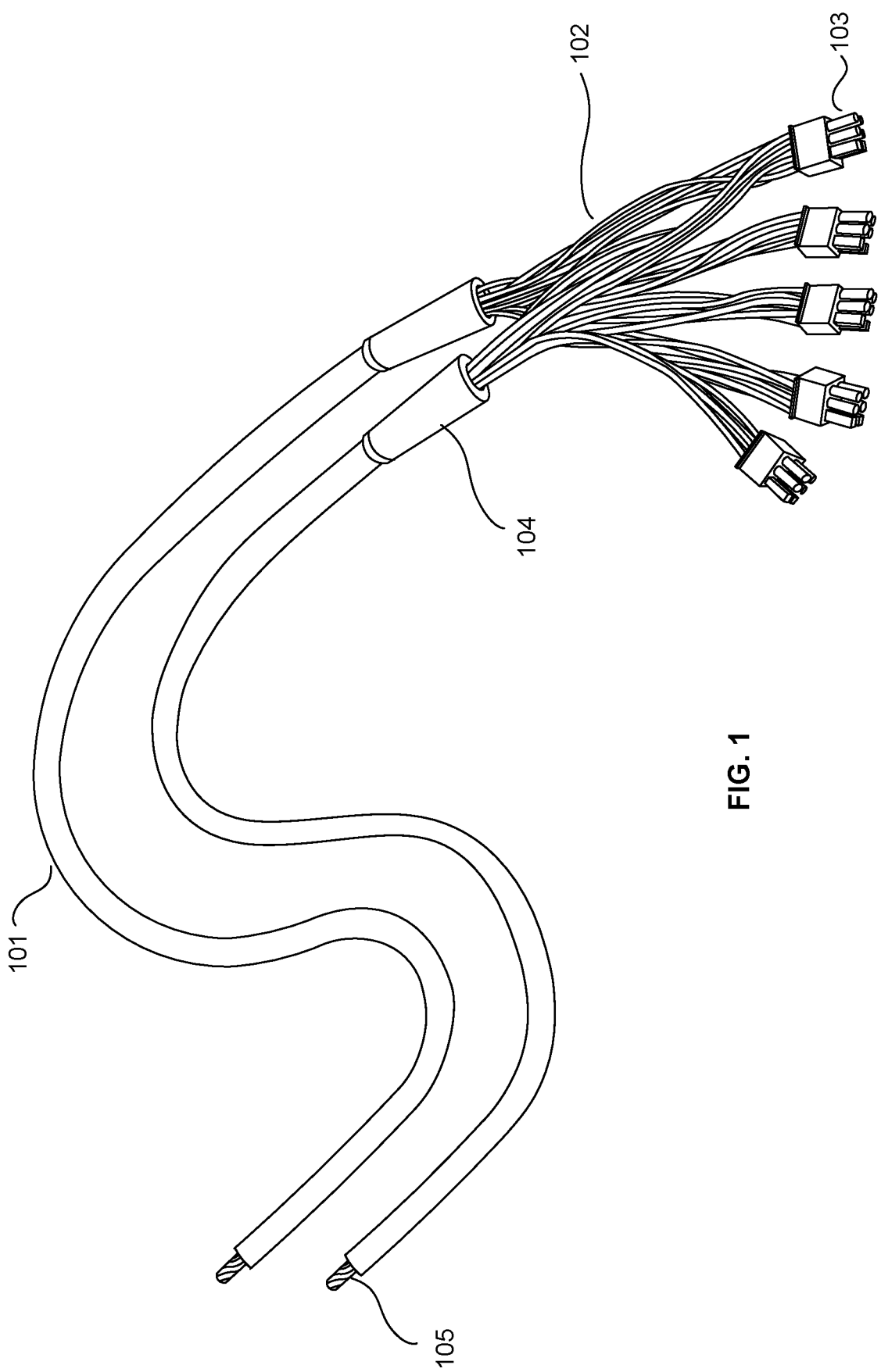
FIG. 1 is a top view of the electrical harness of the present invention.

Referring now to FIG. 1, there is shown the composition of the electrical harness used to distribute some the output current from the power supply to some of the input connectors of the cryptocurrency miner. The harness is composed of a polarized pair of insulated main conductors 101, each of which is attached to a bundle of identically polarized insulated secondary conductors 102. The secondary conductors terminate in a number NC of polarized plug-in connectors 103 of type matching the DC input power socket on the specific miner to be powered. Each main conductor is of the same length, denoted as L1. The length of each secondary conductor is L2, although some secondary conductors may deviate from this value as described further down in the description of the method for sizing the harness. For convenience, the definitions of variable parameters such as L1 are listed in Table 1. In the preferred embodiment of the invention, the polarities correspond to the +12V and "ground return" terminals of the power supply, and the insulation of conductors 101 and 102 is colored according to each polarity. In the preferred embodiments of the present invention, the connectors are 6-pin, 6+2 pin, or 8-pin PCI-e power male connectors, NC ranges from three to six, the number of secondary conductors attached to each of the main conductors is three times NC, the main conductor is implemented with 8-10 AWG specialty fine-stranded silicone-insulated wiring with L1 ranging from 250 to 600 mm (approx. 10 to 24 inches), and the secondary conductors are implemented with 16-18 AWG UL1007 THHN wiring with L2 ranging from 75 to 150 mm (approx. 3 to 6 inches).

Still referring to FIG. 1, the free end of each main conductor 101 is stripped of insulation over a length LE, and tinned with abundant amount of solder so as to effectively form a solid cylindrical pug 105 of length LE and diameter DE ("tinned end pug"). An electrically insulated conducting joint 104 is used to attach each polarized main conductor to the bundle of secondary conductors of same polarity. The joint must present low electrical resistance and offer mechanical strength against pulling. In the preferred embodiment of the invention, the joint is implemented using a crimped sleeve firmly clamping the bare stripped ends of the main and secondary conductors, and is electrically insulated by double wall adhesive-lined heat shrink tubing. The primary function of the harness shown in FIG. 1 is to distribute the current from a given pair of polarized output blades on the power supply to a given subset of input connectors on the cryptocurrency miner. The composition of the harness shown in FIG. 1 enables several of the advantages offered by the present invention compared to existing industry practice, as detailed at the end of the detailed description.

Figure 2:
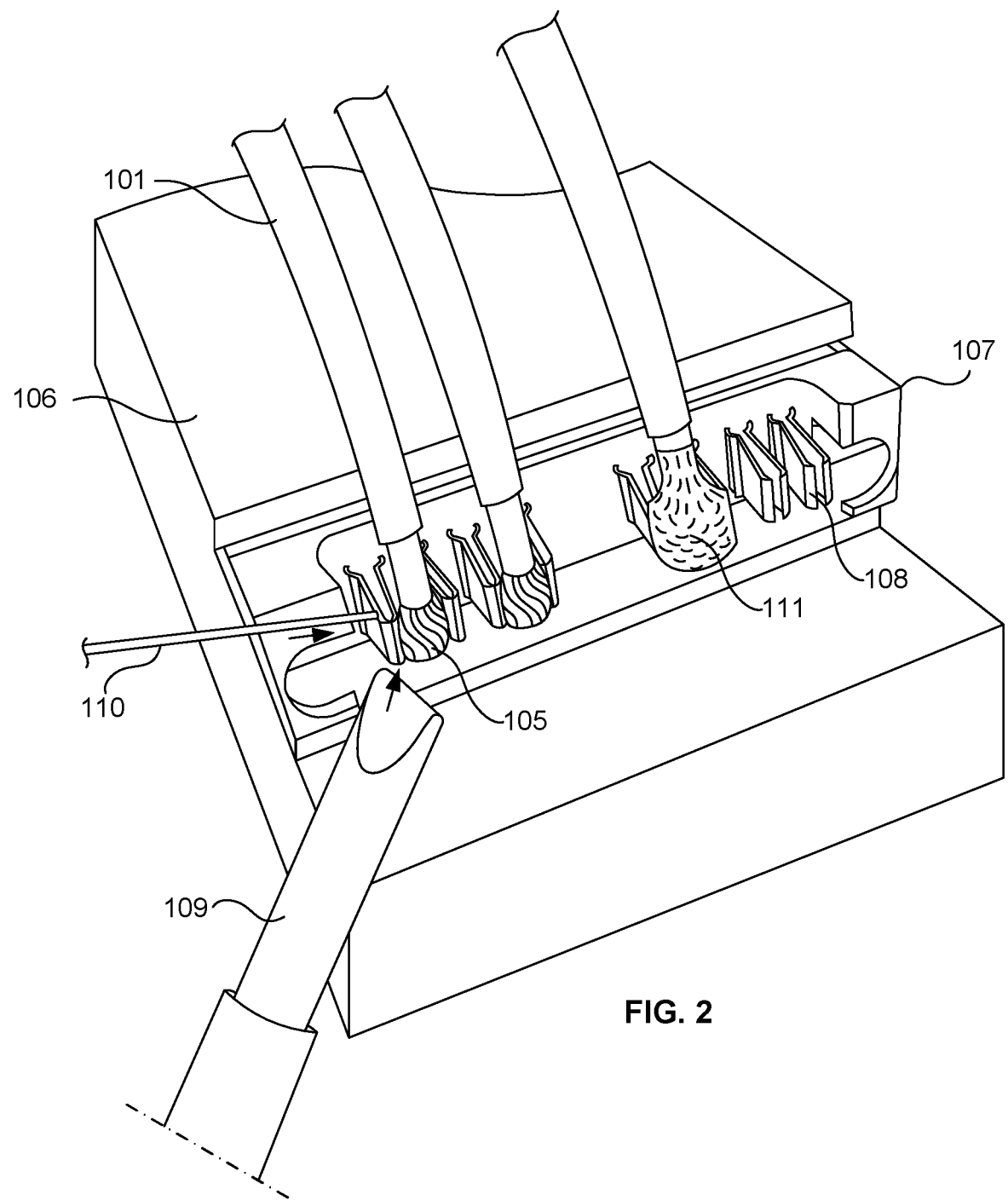
FIG. 2 is a perspective view of the first step in the method for attaching the said harness to the regulated DC output blades of a typical server or mainframe power supply.

The method for attaching one or more harnesses to the output blades of a power supply shall be described now. This method comprises two distinct steps—an attachment step and a shielding step. Referring now to FIG. 2, there is shown the attachment step. In the beginning of this step, the housing of the output connector 107 of the power supply 106 may be cut open to provide access to the regulated DC output blades 108 ("output blades"). Then, the tinned end pug 105 of each main conductor 101 is positioned against a matching polarity output blade, and heated with a soldering tool 109 until the pug 105 melts and establishes a solid metal joint 111 between the blade 108 and the main conductor 101.

In the present best practice of this method, a length of rosin core solder wire 110 of carefully chosen diameter is fed into the joint during this process to provide a fuller joint with maximum strength and minimum electrical and heat resistance. Also in the present best practice, the soldering tool 109 is a heated block of metal that has been custom-shaped to fit precisely the blade outline of the output connector 108 of the specific power supply model used, so that the several harnesses usually required by a single power supply can be soldered at the same time. This best practice does not exclude from the scope of the present invention the use of other tools by persons of ordinary skill, such as a high-power soldering iron or a pencil torch, to achieve a substantially similar result. The positioning of tinned end pugs 105 against the output blades 108 can be optimized to take advantage of the layout of different blade polarities in the connector 107, which varies across different power supply models. When blades of same polarities are clustered together, it is best to squeeze each tinned end pug in the gap between adjacent blades. When blades of different polarities alternate, it is best to pry the two lamellae of each blade apart, and squeeze each tinned end pug between them.

Figure 3:
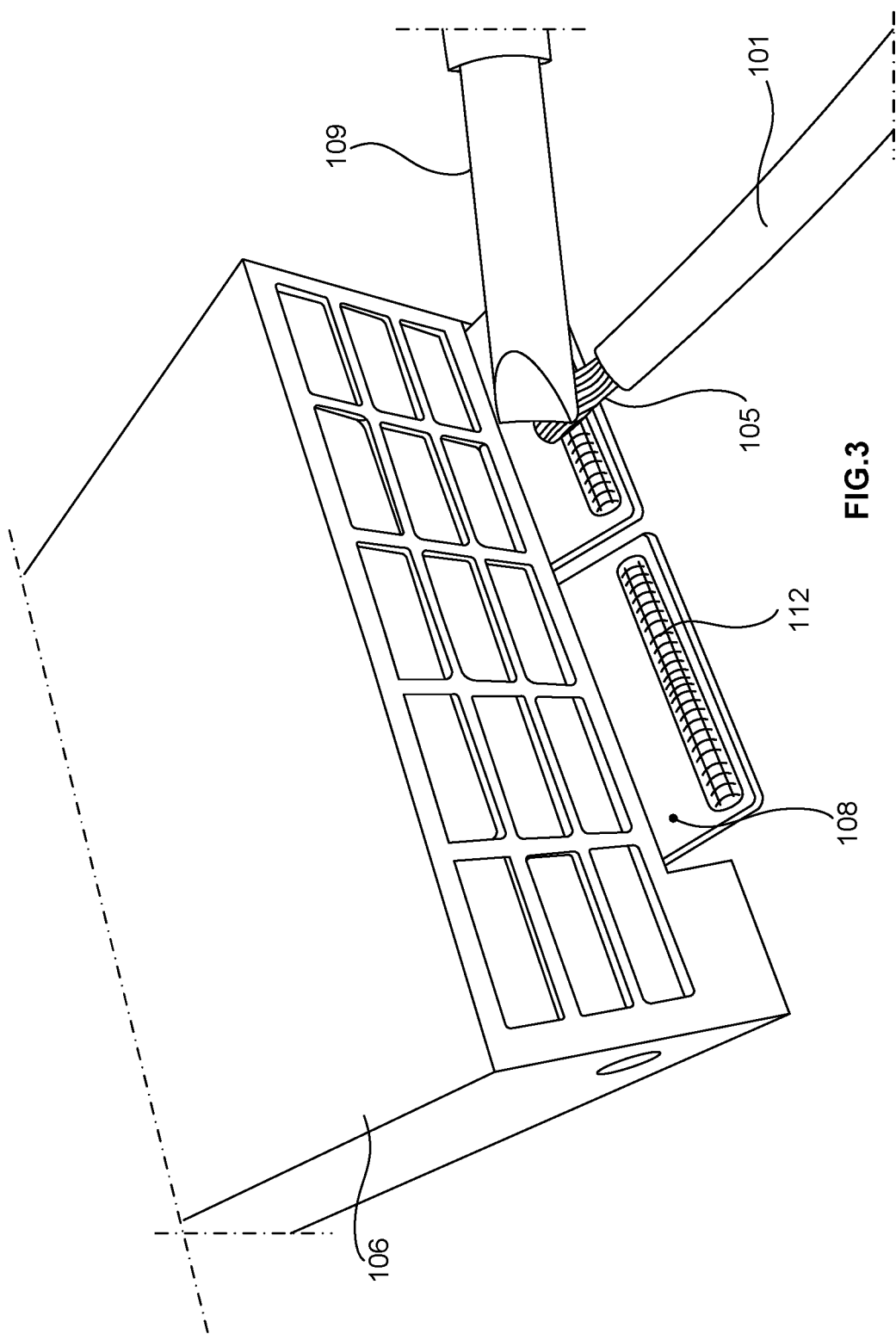
FIG. 3 is a perspective view of a variation of the said first step in the case where the server power supply features flat contact blades on extensions of the printed circuit board.

Referring now to FIG. 3, there is shown a variation of the attachment step of the method, which is specific to power supplies where the regulated DC output blades are implemented as flat copper-clad extensions of the power supply printed circuit boards. In this case, each output blade 108 is prepared by deposition of a thick bead of solder 112 along the copper surface. Then, the tinned end pug 105 is apposed over the bead, and heated with soldering tool 109 until the solder melts and forms a broad meniscus between the main conductor 101 and the output blade 108. The soldering tool is then removed and the assembly left to cool until a solid joint is formed. During practical use of the invention, it has been observed that use of the bead 112 completely eliminates the local heat damage and delamination that occasionally occurs if the end pug 105 is soldered directly on the blade surface without such bead. The bead prevents this by acting as a collector over the surface of the blade, and providing a mode uniform variation of the cross-sectional area across which the current flows, thereby avoiding excessive current densities in the contact area between output blade and primary conductor.

Since multiple harnesses may be used to connect one power supply to one or more miners, the attachment step shown in FIG. 2 or FIG. 3 is repeated until the main conductors of all harnesses are securely affixed to the output blades. In the current best practice of the invention, the number of harnesses per power supply NH ranges from two to eight.

Figure 4:
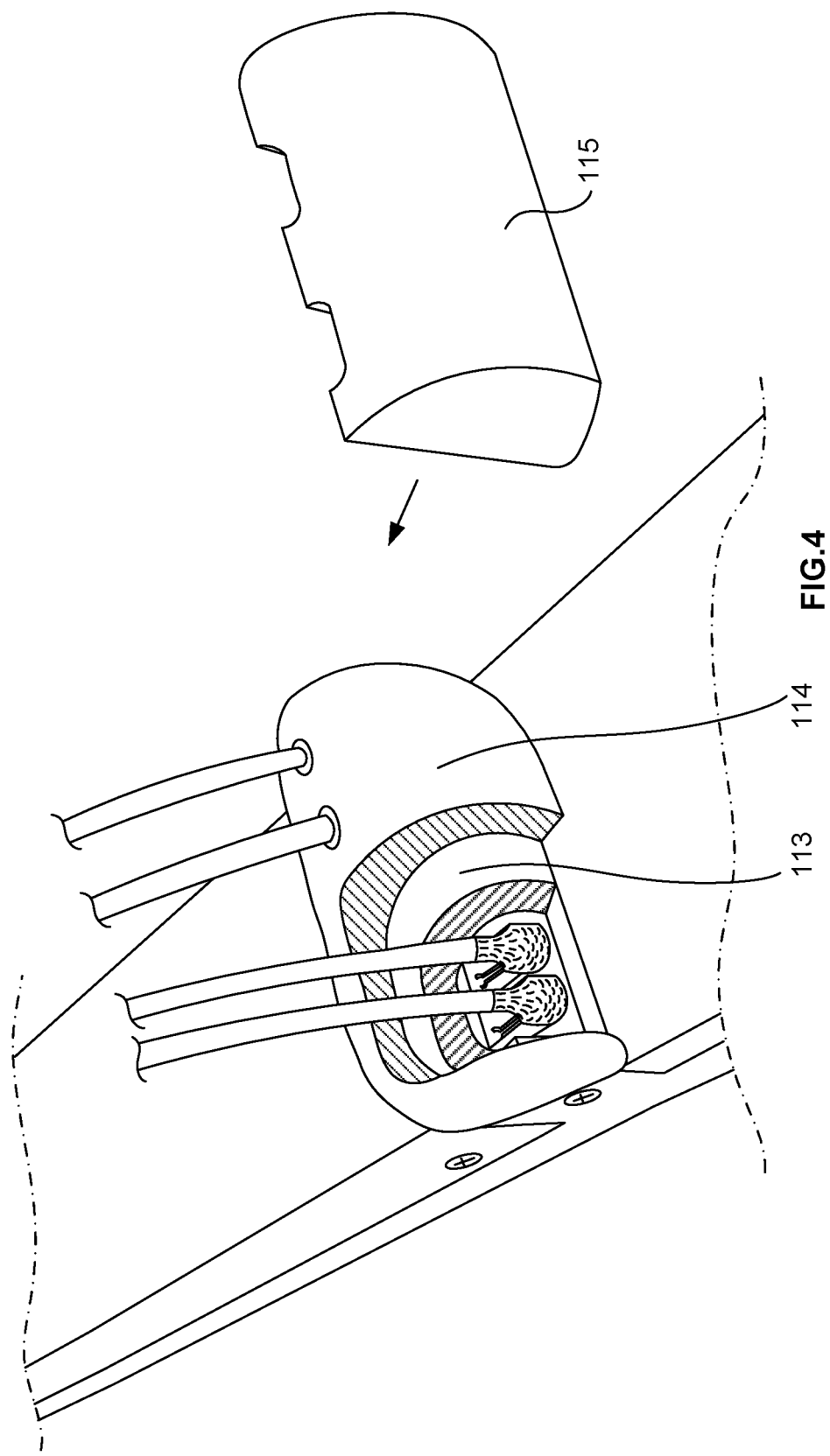
FIG. 4 is a perspective view of the second step in the method for attaching the harness to the power supply.

Referring now to FIG. 4, there is shown the second step ("shielding step") of the method for attaching harnesses to the output blades of a server power supply. This step consists in molding a shield around the area where the main conductors were soldered to the power supply blades. The purpose of the shield is to provide electrical insulation, additional mechanical strength, and resistance to handling; and also to improve the aesthetic appearance of the assembly formed between the harnesses and power supply.

In the preferred embodiment of the invention, the shield is formed by two layers. An inner shield layer 113 is formed first around the soldered joint area to insulate the electrical conductors and enhance the joint strength. Then, an outer shield layer 114 is applied over the inner shield to provide a smooth, visually pleasing appearance to the harness—power supply assembly. The outer shield final shape may be imparted using a mold 115. The mold is custom-made for a specific final shape, and can be 3D printed or manufactured using traditional mold-making methods.

In the typical practice of the invention, the formation of the inner shield 113 and outer shield 114 can be done quickly and efficiency by hand, even for relatively large quantities of power supplies. In the preferred embodiment, the material used for the shield is a thermoset polymer, such as a binary epoxy resin+hardener system ("epoxy"). Multiple types of epoxies have been found to perform satisfactorily in the course of developing the present invention, and the method claimed shall not be limited by a particular choice of epoxy. The most important properties of the epoxy chosen are (a) working consistency, (b) working and curing times, (c) cost, (d) dielectric strength, (e) cured mechanical strength and (f) cured decomposition temperature. In the preferred embodiment of the invention, the optimal working consistency is that of wet clay, which permits easy shaping by hand, while precluding sagging or deformation during curing. The optimal working time is of the order of one hour. To achieve the desired properties and further reduce cost, the epoxy can be blended with an inert filler material such as short fiberglass fibers or gypsum powder.

In a broader embodiment of the invention, the inner and outer shield layers can be merged and realized as a single layer, or alternatively as a multiple sequence of layers, deposited and cured by an automated process. In such broader embodiment, the choice of shield material is heavily influenced by the available manufacturing equipment. The shielding step of the method claimed in the present invention shall not be limited by the particular choice of polymer or formation process.

The apparatus and attachment method of the present invention as described above feature a number of parameters the exact value of which depends on the type of power supply and miners used. The sizing method of the present invention for optimally determining these parameters and for sizing the harness given specific miners and server power supplies shall be now described. All parameters referred to in the present specification are also enumerated and defined in Table 1.

The input to the sizing method consists in the following list of parameters:
  a) IM, electrical current required per individual miner
  b) NI, number of power input connectors per individual miner
  c) IC, maximum electrical current rating for each said power input connector
  d) SCC and SCR, distances characteristic of said connectors layout, as defined in Table 1
  e) IP, maximum rated output current of the power supply at the miner required voltage
  f) NB, number of polarized pairs of output blades available on the power supply
  g) IB, maximum rated output current per said blade
  h) SBH and SBG, height of said blades and gap distance between blades, as defined in Table 1
  i) S, maximum miner and power supply separation distance, as defined in Table 1
  j) SM and SP, linear dimensions of miner and power supply defined in Table 1
  k) TMAX, maximum operating temperature allowed for the assembly The output of the sizing method is the following list of parameters, which sizes the harnesses, and defines the manner in which they are used to connect miners and power supply:
  a) NM, number of miners per power supply
  b) NH, number of harnesses per power supply
  c) NC, number of connectors per harness
  d) L1 and L2, length of harness primary and secondary conductors
  e) LE and DE, length and diameter of primary conductor free end tinned pug
  f) WT1, WG1 and WX1, parameters describing the wire used for the primary conductor, and defined in Table 1.
  g) WT2, WG2 and WX2, parameters describing the wire used for the secondary conductor, and defined in Table 1.

The sizing method consists in the following sequence of steps. The first step determines the number of miners per power supply NM, as follows:
  NM=largest positive integer less or equal than IP/IM,
  and subject to the per-blade current constraint NM*IM/NB<IB.

In the typical practice of the present invention, IP ranges from 100 to 400 amperes, IM ranges from 50 to 150 amperes, IB ranges from 30 to 50 amperes, NB ranges from one to eight, and the resulting NM ranges from one to four.

The second step of the sizing method determines the length L1 of the main conductor as follows:
  L1=Square Root of (S*S+0.25*SM*SM+0.25*SP*SP)
This formula represents an empirical determination of the optimal compromise between cost and convenience for the harness length. In the typical practice of the present invention, L1 ranges from 250 to 600 mm (approx. 10 to 24 inches).

The third step determines the length of secondary conductors L2 as follows:
  L2=Square Root of (F*F+NI*SCC*SCC+NI*SCR*SCR)
where F is a distance factor of 75 mm (approx. 3 inches), empirically determined during the development of the invention, and allowing a practitioner with average hand size to comfortably reach within the bundle of secondary connectors and attach them to the miners while the latter are shelved on the otherwise tight spacing of a typical cryptocurrency mine. Many miners feature a single special-purpose input connector socket set apart from the main cluster of input sockets. The length of secondary conductor to this socket can be extended beyond the calculated value of L2 to allow for said socket to be reached. In the typical practice of the present invention, L2 ranges from 100 to 150 mm (approx. 4 to 6 inches).

The fourth step of the sizing method determines the number of harnesses per power supply NH, numbers of connectors per harness NC, wiring gauges, and wiring types by formulating and solving the following non-linear optimization problem:
  Minimize: Cost=NH*LookUpCostHar(L1, NC, WG1, WT1, WX1, TMAX)+NC*NH*LookUpCostCon(L2, WG2, WT2, WX2, TMAX)
Subject to the following constraints:
  a) NH>0; NC>0
  b) NH*NC≥NI*NM
  c) NH=k*NB or NB=k*NH, where k is a positive integer.
  d) IP/(NH*NC)<IC
  e) IP/NH<LookUpMaxCurrent(WG1, WT1, WX1, TMAX)
  f) IP/(NH*NC)<LookUpMaxCurrent(WG2, WT2, WX2, TMAX)

Constraint (a) imposes a non-trivial solution to the optimization problem.

Constraint (b) ensures all miner input connectors are supplied.

Constraint (c) imposes a pattern for soldering harnesses to blade pairs. In the course of solving the optimization problem, only one form of this constraint will be satisfied. This will indicate whether multiple harnesses should be joined to each blade, or whether each harness should be shared between multiple blades.

Constraint (d) ensures the current rating of individual miner input connectors is not exceeded.

Constraint (e) ensures the current rating of the primary conductors is not exceeded.

Constraint (f) ensures the current rating of the secondary conductors is not exceeded.

The cost lookup functions, defined in Table 1, are compilations of third party vendor cost quotations and industry catalog data, as accumulated by each practitioner of the present invention over time. These functions will vary by practitioner and over time as industry costs change. Because they are practitioner-specific inputs to the sizing method, the values and content of the underlying lookup tables are not included in the present invention. The maximum current lookup functions, defined in Table 1, are also practitioner-specific compilations of vendor and industry catalog data, and their underlying values and lookup table data are likewise not included in the present invention. In the typical practice of the present invention, NH ranges from two to eight, NC ranges from three to six, the primary conductor is a AWG 8-10 braided stranded copper wire, and the secondary conductor is AWG 16-18 braided stranded copper wire.

The fifth and last step of the sizing method determines length LE and diameter DE of the tinned pug at the free end of the harness primary conductor in the following empirical manner:
  LE=1.25 SBH, but no less than 2.0 mm or more than 25 mm;
  DE=1.10 SBG, but no less than 2.0 mm or more than 14 mm;

These have been empirically determined in the course of developing the present invention to allow for easy soldering and robust joints between the primary conductor and the power supply output blades. In the typical practice of the present invention LE ranges from 10 to 15 mm (0.4 to 0.6 inches) and DE ranges from 4 to 8 mm (0.15 to 0.30 inches).

Two examples of embodiments of the present invention shall be now described to illustrate the practice of the invention. These examples are not theoretical—said embodiments exist and operate in large scale in the applicant's own cryptocurrency mining facilities. This proven experience has demonstrated the advantages of the present invention relative to current industry practices.

In the first example, the present invention is used to retrofit a 2.9 kW-class IBM Corporation Bladecenter® server power supply ("Bladecenter") with a universal harness so that it powers a pair of almost any currently available ASIC cryptocurrency miners. This particular class of power supplies offers performance features that make it ideal for large-scale cryptocurrency mining facilities. The existing breakout board adaptations used by the industry for this power supply class are known for their poor reliability and catastrophic failure due to the high power levels transmitted. This embodiment of present invention resolves these shortcomings. In addition, the sizing method of the invention is used in a manner to produce a harness arrangement that is universally interchangeable across many different models of ASIC miners. This universally interchangeable harness has been proven extremely convenient in actual use in large mining facilities.

Figure 5:
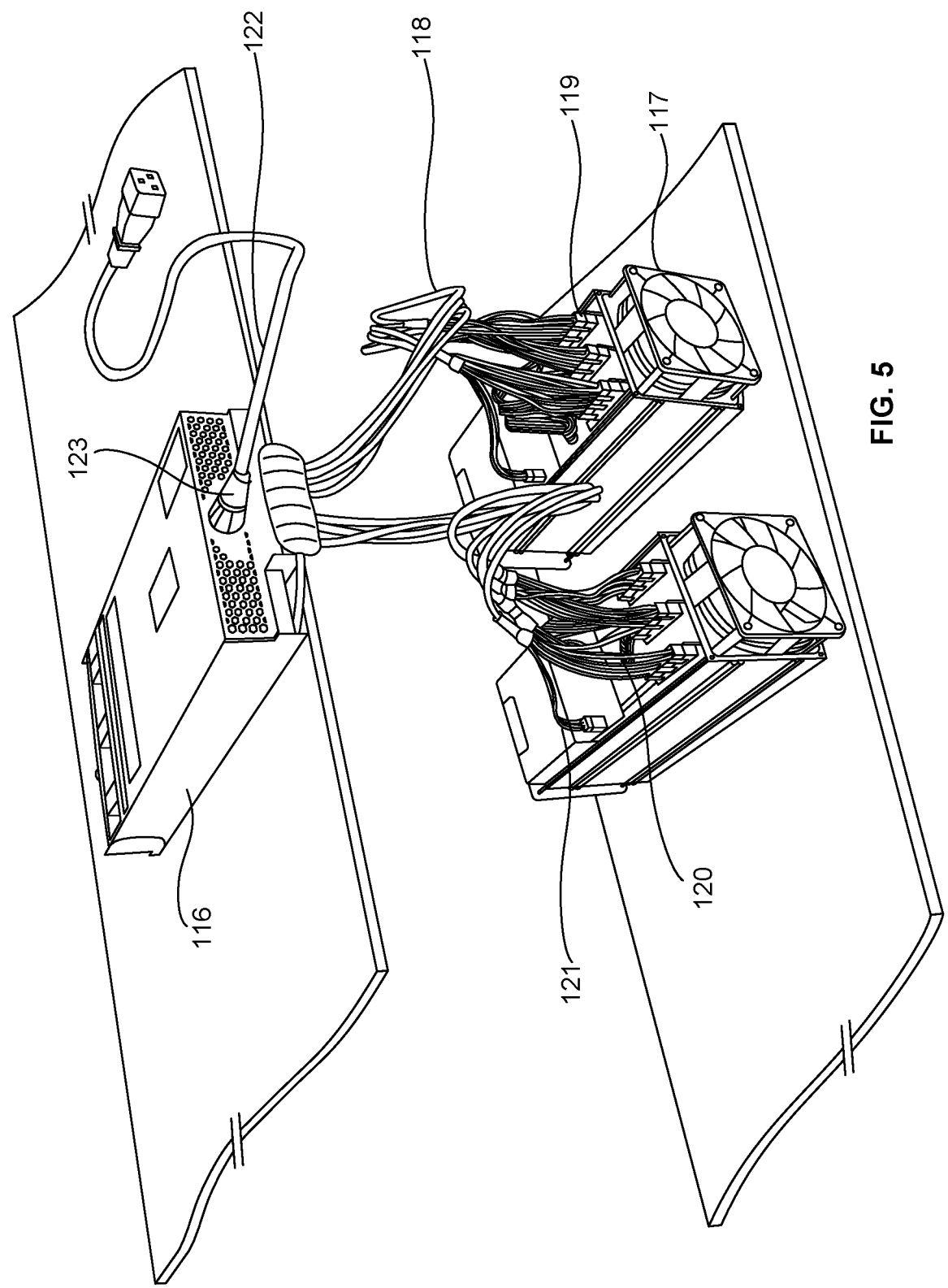
FIG. 5 is a perspective view of a specific embodiment of the invention in practical use.

Referring now to FIG. 5, there is illustrated this first example of embodiment of the present invention. The Bladecenter 2.9 kW-class power supply 116 and two typical ASIC miners 117 (which are not part of the invention), are shown for reference and illustrative purposes. To get a universally interchangeable harness, the sizing method input parameters are chosen to represent a generic miner with characteristics that are a superset of the major families of ASIC miners in industry use (Bitmain Technologies Ltd Antminer® S5, S7, S9, T9, D3, and L3+ models; Canaan Creative Ltd Avalon™ A741). All power supply models in the Bladecenter 2.9 kW-class family feature a 6P+20S+6P backplane edge power connector from the Amphenol Corporation PwrBlade® connector series, which is widely used in many server power supplies. The power supply is considered to deliver 3000 Watts at 12V DC for the purposes of sizing. The sizing method input parameters are therefore as follows:
  a) IM=125 amperes (generic 1500 Watt miner)
  b) NI=10 (maximum 10 connectors per miner, 9 power+1 control)
  c) IC=15 amperes (typical practical limit of 6-pin connectors in industry use)
  d) SCC=SCR=75 mm (approx. 3 inches) compiled across miner models
  e) IP=250 amperes (3000 Watts @12 VDC)
  f) NB=6 (six blade pairs on 6P+20S+6P backplane edge power connector)
  g) IB=50 amperes (typical for the backplane power connector in this family)
  h) SBH=6 mm (approx. 0.25 inches); SBG=4.5 mm (approx. 0.2 inches)
  i) S=200 mm (approx. 8 inches, provides generous spacing allowance)
  j) SM=350 mm (approx. 14 inches) and SP=450 mm (approx. 18 inches)
  k) TMAX=90 degrees Celsius (maximize operational safety)

The resulting embodiment shown in FIG. 5 features four harnesses 118 per power supply 116, implemented with 24-inch long 8AWG high-flexibility fine-stranded copper high-temperature silicone-insulated cable as primary conductor. Each harness carries five 6-pin male PCIe connectors 119 on bundles of 125 mm (approx. 5 inch) long 16AWG braided stranded copper THHN secondary conductors 120—except on two of the harnesses, where one secondary conductor is 175 mm (approx. 7 inch) long in order to provide extended reach for one connector 121 for powering the controller on certain ASIC miners. The secondary conductors are crimped to the primary conductor using a 7.2 mm diameter #5AWG copper crimp sleeve. This crimped joint is insulated with a double-wall adhesive-lined 3:1 heat shrink tubing. The tinned pug at the free end of the primary conductors is 5 mm (approx. 0.2 inches) in diameter and 8 mm (approx. 0.3 inches) in length, and permits two primary conductors of the same polarity to be soldered in the gap between three output blades in a monolithic, solid joint that minimizes resistance and maximizes heat transfer.

The specific embodiment in FIG. 5 also shows how the attachment method of the present invention can be applied by practitioners of the invention to attach an AC power cord 122 to the high-voltage AC input blades of the server power supply. The attachment joint, shown as 123 on FIG. 5, offers significant convenience and improved reliability to miner operators. Because server power supplies are not standalone units and do not feature standard AC power sockets, the cryptocurrency mining industry has traditionally used breakout boards or crimp connectors to supply high voltage AC electric power. The disadvantages of these traditional methods were described in the invention background. For example, the AC input breakout board for the Bladecenter 2.9 kW-class power supply is known for its catastrophic failure and fire risk.

Figure 6:
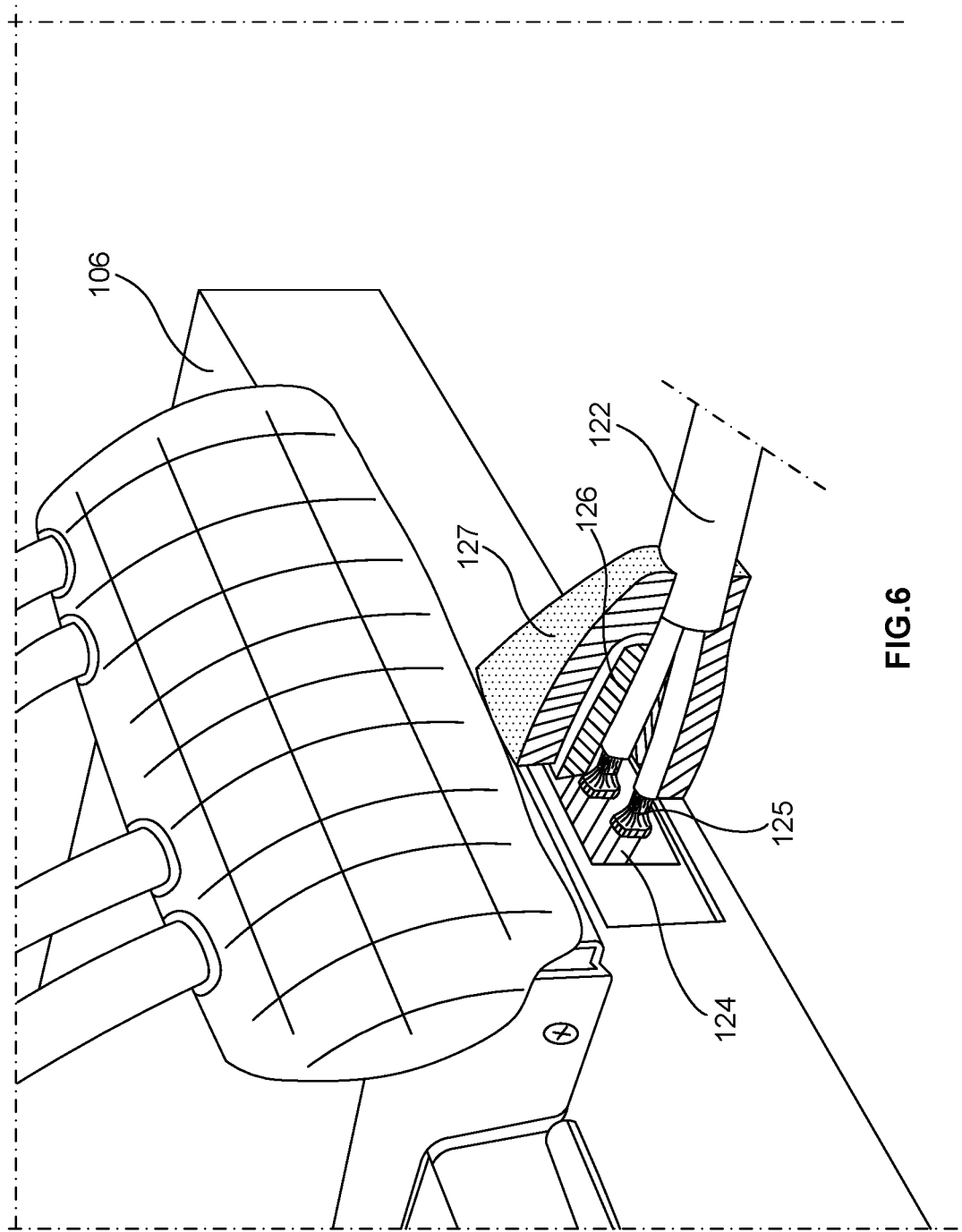
FIG. 6 is a perspective view of adapting the harness attachment method for the purpose of endowing the server power supply with an ordinary power cord.

Referring now to FIG. 6, there is shown in more detail the application of the present invention attachment method to affix an AC power cord 122 to the high voltage AC input blades 124 of the power supply 106. In a first step, the free end of each AC power cord wire is stripped, formed into a tinned pug, and soldered to the AC input blades in a manner to form a solid block of solder 125. Specifically, this first step consists in the following sequence of operations:
  a) Obtaining an open-ended AC power cord with the desired rating, length, and plug terminal. In the typical practice of the present invention this is a 3-conductor, 12 to 16 AWG, SJT or 5300 W cord terminating in an IEC320 C20 or C14 plug.
  b) Exposing the conductors at the open end over a length ranging from 12 mm to 50 mm (approx. 0.5 to 2.0 inches), and stripping the said conductors over a length of approximately 8 mm (approx 0.3 inches).
  c) Braiding and tinning the stripped portion of the each conductor so as to form a solid cylindrical pug of solder.
  d) Optionally fitting each said pug with a spade crimp connector of appropriate size in order to temporarily hold the pug against the appropriate power supply AC input blade during the soldering step "f" below.
  e) Inserting the said pug of each conductor (or spade terminal of crimp connector if optional step "d" above has been used) into the corresponding phase or ground AC input blades 124.
  f) Heating the junction thus formed with a soldering tool, and feeding solder wire and flux therein until a solid joint 125 is formed between the conductors and the AC input blades 124.

Thereafter, an inner shield 126 and outer shield 127 are molded over the joint using the same materials and procedures as those used for the DC harnesses attachment method second step. Once the shields have cured, the power supply is endowed with a power cord, and can be easily and reliably plugged in the electrical distribution system of a typical cryptocurrency mine. This is a significant improvement over current industry practices.

In the second example of specific embodiment, the present invention is used to retrofit a Hewlett-Packard Company Proliant® 1200 Watt-class server power supply ("Proliant power supply") with a harness suitable for powering a typical open-frame GPU cryptocurrency miner. This particular class of power supplies is highly popular in cryptocurrency mining due to its compact form factor, low cost, and broad availability. The Proliant power supply is characterized by a single pair of polarized output blades formed as large flat extensions of the PCB board. The typical open-frame GPU miner contains between 6 to 12 GPU cards, each of which normally consumes from 150 to 300 Watts of power at 12V DC. The GPU cards are normally set between 50 mm to 150 mm (approx. 2 to 6 inches) apart, and may be up to 500 mm (approx. 20 inches) away from the power supply. The sizing method input parameters for the second example are therefore:

a) IM=IB=IP=100 amperes (implied by the application, 1200 Watts @12 VDC)
b) NI=12 (6 GPUs with two connectors per GPU)
c) IC=15 amperes (typical practical limit of 6-pin connectors in industry use)
d) SCC=0; SCR=150 mm (approx. 6 inches)
e) NB=2 (single flat blade pair)
f) SBH=6 mm (approx. 0.25 inches); SBG=0 mm (single pair with no gap)
g) S=500 mm (approx. 20 inches)
h) SM=300 mm (approx. 12 inches) and SP=250 mm (approx. 10 inches)
i) TMAX=90 degrees Celsius (maximize operational safety)

The resulting embodiment, optimized for cost and performance by means of the invention sizing method, features three harnesses per Proliant power supply. The primary conductors are implemented with 750 mm (approx. 30-inch) long 10AWG high-flexibility fine-stranded copper silicone rubber-insulated cable. Each harness carries four 6+2-pin male PCIe connectors on bundles of 175 mm (approx. 7-inch) long 16AWG stranded copper THHN secondary conductors. The secondary conductors are crimped to the primary conductor using a 7.2 mm diameter #5AWG copper crimp sleeve. This crimped joint is insulated with a double-wall adhesive-lined 3:1 heat shrink tubing. The tinned pug at the end of each primary conductor is 4 mm (approx. 0.16 inches) in diameter and 8 mm (approx. 0.3 inches) in length.

While the foregoing description of the invention enables a person of ordinary skill in the art to make and use what is considered presently to be the best mode thereof, those of ordinary skill in the art will understand and appreciate the existence of variations, combinations, and equivalents of the specific embodiments, methods, and examples herein. For example, the combination of apparatus, attachment method, and sizing method of the invention is easily applied to server power supplies or alternative DC power sources other than the ones used in the foregoing illustrations. Likewise, the invention is easily applicable to powering future blockchain devices other than the kilowatt-class cryptocurrency miners typical of the industry and used in the foregoing illustrations. Therefore, the invention should not be limited by the above described embodiments, practices, and examples, but shall comprise all embodiments and methods within the scope and spirit of the invention as claimed.

The advantages of the present invention include, without limitation:

a) Reliable delivery of the large electrical currents required by cryptocurrency miners with reduced risk of contact overheating and burnout. This is due to the soldered junction which minimizes electrical and thermal resistances, and allows the large-gauge body of the primary conductors to serve as extended heat sink for the power supply terminals.
b) Electrical insulation of all hot points of the DC supply to the miner, thereby eliminating the risk of short circuits and arcs during the course of normal mining facility handling and maintenance.
c) Improved airflow and thereby cooling around the miners and the power supplies in the dense rack setups typical of large mines, due to the lesser encumbrance of the harness primary conductor relative to other options.
d) Ease of connection, since the harness as attached to a server power supply creates a simple "plug-and-play" solution in contrast to breakout boards which require assembly at the point of use.
e) Ability to use a broad range of high-performance, high-efficiency, low-cost secondary market power supplies for which breakout boards are not available.
f) Greater options for layout of miners and power supplies, due to the longer and more flexible reach of the harness, compared to other solutions.
g) Universality across different miner models, which makes it easy for large mining facilities to upgrade or reconfigure their mix of miner models without replacing or rearranging power supplies. As shown in the examples, the invention sizing method allows a person of ordinary skill to create harnesses that are "universally" interchangeable across a broad range of current and future cryptocurrency miners.

These advantages are significant and not theoretical. They have been proven in actual large scale long-term use in the cryptocurrency mining facilities operated by the inventor.

TABLE 1

List of unique symbols used in present specification (in alphabetical order)

| Symbol | Meaning of Symbol |
|---|---|
| DE | Diameter of tinned pug on the stripped free end of the primary conductor. |
| IB | Electrical current, maximum rated per output blade of server power supply. |
| IC | Electrical current, rating per connector, being the smaller of (a) maximum rating of individual connector type used on electrical harness, and (b) maximum rating of individual connector socket used on miner. |

TABLE 1-continued

List of unique symbols used in present specification (in alphabetical order)

| Symbol | Meaning of Symbol |
| --- | --- |
| IH | Electrical current, in each primary conductor of electrical harness, during normal operation of miners. |
| IM | Electrical current, required by an individual blockchain processing device such as cryptocurrency miner to be powered. |
| IP | Electrical current, maximum rated total output of server power supply across all output rails at the voltage required by the miners (usually +12 V DC). |
| L1 | Length of primary conductor of electrical harness. |
| L2 | Length of secondary conductor of electrical harness. |
| LE | Length of tinned pug on the stripped free end of the primary conductor. |
| LookUpMaxCurrent | Discrete table lookup function, providing maximum rated current of a wire given wire gauge, wire type, wire insulation type, length, and operating temperature. This lookup function is the result of compilation of third-party industry and vendor data, as accumulated by each practitioner of the present invention. The tabulated data defining this lookup function is commonly available, and is not subject to the claims in this application. |
| LookUpCostCon | Discrete table lookup function, providing the cost per connector and secondary conductors attached thereto, and dependent on connector type, L2, WG2, WT2, WX2, and TMAX. This lookup function is the result of compilation of third party vendor cost quotations and catalog data, as accumulated by each practitioner of the present invention. The tabulated data itself which determines specific values of the lookup function is not subject to the claims in this application. |
| LookUpCostHar | Discrete table lookup function, providing the cost per electrical harness excluding connectors and secondary conductors, and as dependent on joint type, L1, NC, WG1, WT1, WX1, and TMAX. This lookup function is the result of compilation of third party vendor cost quotations and catalog data, as accumulated by each practitioner of the present invention. The tabulated data itself which determines specific values of the lookup function is not subject to the claims in this application. |
| NB | Number of polarized pairs of output blades on power supply (at the voltage required by the miners). |
| NC | Number of connectors, such as PCIe connectors, per harness. |
| NH | Number of electrical harnesses per power supply. |
| NI | Number of power input connectors, such as PCIe connectors, per miner. |
| NM | Number of miners per power supply. |
| S | Maximum separation between miner(s) and power supply in the mining layout of the practitioner. |
| SBG | Gap, or separation distance, between the regulated DC output blades of the power supply. For power supplies where the output blades of same polarity are grouped together in the backplane power connector, this is the gap between lamellae of two adjacent blades. For power supplies where the output blades of opposite polarity alternate, this is the gap between the lamellae of an individual blade. |
| SBH | Height of output blade of power supply. |
| SCC | Average distance between columns of connector sockets on miner, or approximation thereof when connector sockets are not arranged regularly. |
| SCR | Average distance between rows of connector sockets on miner, or approximation thereof when connector sockets are not arranged regularly. |
| SM | Longest linear dimension of miner. |
| SP | Longest linear dimension of power supply. |
| TMAX | Maximum rated operating temperature of electrical harness. |
| WG1 | Wiring gauge for primary conductor. |
| WT1 | Wiring type for primary conductor (alphanumeric industry or vendor designation, such as "THHN"). |
| WX1 | Wiring insulation type for primary conductor (alphanumeric industry or vendor designation, such as "90 deg C. butyl rubber"). |

TABLE 1-continued

List of unique symbols used in present specification (in alphabetical order)

| Symbol | Meaning of Symbol |
|---|---|
| WG2 | Wiring gauge for secondary conductor. |
| WT2 | Wiring type for secondary conductor (alphanumeric industry or vendor designation, such as "THHN"). |
| WX2 | Wiring insulation type for secondary conductor (alphanumeric industry or vendor designation, such as "90 deg C. butyl rubber"). |

What is claimed is:

1. A wiring harness comprising:
a plurality of electrical connectors, wherein each electrical connector comprises at least two connector pins, and wherein the connector pins of each electrical connector are designated to be polarized at either a first voltage or a second voltage;
a plurality of first polarity secondary conductors, each having a first and second extremity, wherein the first extremity of each first polarity secondary conductor is connected to one of the connector pins of the plurality of electrical connectors designated to be polarized at the first voltage, and wherein each first polarity secondary conductor is insulated and flexible;
a plurality of second polarity secondary conductors, each having a first and second extremity, wherein the first extremity of each second polarity secondary conductor is connected to one of the connector pins of the plurality of electrical connectors designated to be polarized at the second voltage, and wherein each second polarity secondary conductor is insulated and flexible;
a first polarity joint, wherein the second extremities of all the first polarity secondary conductors are gathered together, and wherein the said joint is electrically conductive, structurally solid, and covered with a layer of electrical insulation;
a second polarity joint, wherein the second extremities of all the first polarity secondary conductors are gathered together, and wherein the said joint is electrically conductive, structurally solid, and covered with a layer of electrical insulation;
a first polarity primary conductor, having a first and second extremity, wherein the first extremity is connected to the first polarity joint in a manner to provide electrical continuity and solid connection between the first polarity primary conductor and the plurality of first polarity secondary conductors, and wherein the second extremity is left open; and
a second polarity primary conductor, having a first and second extremity, wherein the first extremity is connected to the second polarity joint in a manner to provide electrical continuity and solid connection between the second polarity primary conductor and the plurality of second polarity secondary conductors, and wherein the second extremity is left open.

2. The wiring harness according to claim 1, wherein the open second extremity of the first polarity primary conductor terminates in a first polarity "pug", said "pug" consisting in an exposed non-insulated cylindrical formation deposited over the conducting core of the first polarity primary conductor, and composed of metal alloy of low melting temperature suitable for soldering; and wherein the open second extremity of the second polarity primary conductor terminates in a second polarity "pug" structurally identical to the first polarity "pug".

3. The wiring harness according to claim 1, wherein the plurality of electrical connectors consists in 6-pin, and/or 6+2 pin, and/or 8-pin male PCI-E power connectors.

4. A The wiring harness according to claim 1, wherein the first and second joints are constructed using a cylindrical compression sleeve splice, and insulated using cylindrical sections of heat-shrink tubing insulation.

5. A method for attaching a plurality of the wiring harnesses according to claim 2 to a plurality of polarized DC output blades of a server power supply, comprising the following steps:
a first step of positioning the "pug" of each polarized primary conductor of each wiring harness onto one of the polarized DC output blades of identical polarity in a manner to make the pug contiguous with the conductive portion of the blade;
a second step of heating the pug and the contiguous output blade from the first step, and of applying solder and/or flux thereon, so that a junction of metal is created between the second extremity of each primary conductor and the contiguous output blade, said junction being substantially comparable in size to the contiguous output blade, and being formed in electrically conductive and mechanically solid manner;
repeating the first and second steps until a number of wiring harnesses have been attached to the plurality of output blades; wherein said number of wiring harnesses is determined and distributed amongst the plurality of output blades in manner such that the server power supply delivers the current required by its load without exceeding the rated current limit of any individual output blade or of any component of any wiring harness;
a third step of forming a protective insulating shield over the plurality of junctions formed after completion of the foregoing repetition, by means of successively depositing and molding one or more layers of thermoset resin until said shield covers all voltage-carrying exposed metal parts of each output blade and each wiring harness, and until said shield firmly encloses a portion of the insulation at the second extremity of each primary conductor of each wiring harness, and until said shield abuts the casing of the server power supply; and
a fourth step of finely shaping and polishing the protective insulating shield, either by hand or with a mold, in order to create a solid, continuous, smooth and visually pleasing cover over the area where the plurality of wiring harnesses are attached to the power supply.

6. The method according to claim 5, further comprising a preliminary step of depositing a semi-cylindrical linear bead of solder on the flat conductive surface of each output blade prior to positioning the pugs of the primary conductors, said bead being of size substantially covering the exposed copper layer on the output blade, and said method being specifically applicable to classes of power supplies where the output blades consist in flat copper-clad extensions of the power supply printed circuit boards.

* * * * *